United States Patent
Lu et al.

(10) Patent No.: US 7,620,286 B2
(45) Date of Patent: Nov. 17, 2009

(54) OPTICAL FIBER ACCESS TOOL

(75) Inventors: Yu Lu, Westborough, MA (US); Mark Raymond, Worcester, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/448,188

(22) Filed: Jun. 7, 2006

(65) Prior Publication Data

US 2007/0286564 A1 Dec. 13, 2007

(51) Int. Cl.
*G02B 6/00* (2006.01)
(52) U.S. Cl. .................................. 385/134; 385/136
(58) Field of Classification Search ................ 385/134, 385/136
See application file for complete search history.

(56) References Cited

U.S. PATENT DOCUMENTS

| | | | | |
|---|---|---|---|---|
| 4,434,554 | A * | 3/1984 | Korbelak | 30/90.8 |
| 4,947,549 | A | 8/1990 | Genovese et al. | |
| 4,969,703 | A * | 11/1990 | Fyfe et al. | 385/123 |
| 4,972,581 | A | 11/1990 | McCollum et al. | |
| 5,050,302 | A | 9/1991 | Mills | |
| 5,093,992 | A | 3/1992 | Temple, Jr. et al. | |
| 5,140,751 | A | 8/1992 | Faust | |
| 5,172,620 | A * | 12/1992 | Faust | 83/13 |
| 5,295,421 | A * | 3/1994 | Mansfield | 81/9.4 |
| 5,361,496 | A * | 11/1994 | DeBoalt | 30/90.6 |
| 5,377,564 | A * | 1/1995 | Erlich | 81/9.44 |
| 5,440,665 | A | 8/1995 | Ray et al. | |
| 5,443,536 | A | 8/1995 | Kiritsy et al. | |
| 5,528,718 | A | 6/1996 | Ray et al. | |
| 5,577,150 | A | 11/1996 | Holder et al. | |
| 5,657,413 | A | 8/1997 | Ray et al. | |
| 5,822,863 | A | 10/1998 | Ott | |
| 6,023,844 | A | 2/2000 | Hinson, II et al. | |
| 6,273,990 | B1 * | 8/2001 | Bookbinder et al. | 156/344 |
| 6,581,291 | B1 | 6/2003 | Tarpill et al. | |
| 6,643,448 | B1 * | 11/2003 | Brewer et al. | 385/147 |
| 6,735,875 | B1 * | 5/2004 | Eslambolchi et al. | 30/377 |
| 2002/0026711 | A1 * | 3/2002 | Edwards et al. | 30/90.1 |
| 2005/0044715 | A1 | 3/2005 | Shutts et al. | |

OTHER PUBLICATIONS

FiberOptic Supply, *Buffer Tube Stripper*, internet site, undated (1 page).
Berk-Tek, *Jacket Removal Procedure for Outside Plant Cable*, May 16, 2000 (4 pages).

(Continued)

*Primary Examiner*—K. Cyrus Kianni
(74) *Attorney, Agent, or Firm*—Merchant & Gould P.C.

(57) ABSTRACT

A tool and method for accessing fibers within an optical fiber cable is provided. The tool can be used to access optical fibers within buffer tubes held in distribution cables. The tool works well even when the buffer tubes to be accessed are held tightly within distribution cables. In one embodiment, the tool is clamped over a buffer tube and a blade is slid across a blade guide of the tool to facilitate the cutting of a fiber access window in the buffer tube. The method of accessing fibers within a fiber optic cable includes supporting a section of buffer tube and sliding a blade across the mid-portion of the supported section thereby creating optical fiber access windows therein.

9 Claims, 5 Drawing Sheets

OTHER PUBLICATIONS http://www.ciscopress.com, Cisco Systems, *Fiber-Optic Technologies*, 2006 (4 pages).

Specialized Products Company, *Buffer Tube Access Tool Kit Quick and Easy Access to Fibers Anytime*, 2005 (3 pages).

CESI, *Core Tube Slitters*, internet site, undated (3 pages).

Metrotek, *Cable Jacket/Buffer Tube Stripper*, Internet site, undated (1 page).

FIS Fiber Instrument Sales Inc., *New FTTx Tool Kit from FIS*, 2005 (1 page).

http://www.corning.com/cablesystems, Corning Cable Systems, *Buffer Tube Fan-Out Kits*, Aug. 2002 (2 pages).

Corning Cable Systems, SRP-004-026, Issue 4, *No-Slack Optical Fiber Access Tool* (*NOFAT*), Apr. 2005 (6 pages).

http://www.alcatel.com, *Alcatel 6652 Buffer Tube Access Tool*, Apr. 2003 (2 pages).

* cited by examiner

OPTICAL FIBER ACCESS TOOL

TECHNICAL FIELD

The principles disclosed herein relate to a fiber optic cable access tool.

BACKGROUND

The tool of the present invention is for use on optical fibers. To facilitate the understanding of the invention, an exemplary optical network for delivering high bandwidth communication capabilities to customers is described herein. FIG. 1 illustrates an exemplary network 100. As shown in FIG. 1, the network 100 is a passive network that includes a central office 110 connected to a number of end subscribers 115 and a larger network such as the Internet (not shown). The network 100 includes fiber distribution hubs (FDHs) 130 having one or more optical splitters that generate a number of individual fibers that lead to the premises of an end user 115.

The portion of network 100 that is closest to central office 110 is commonly referred to as the F1 region, where F1 is the "feeder fiber" from the central office. The portion of network 100 that includes a number of end users 115 may be referred to as an F2 portion of network 100. Splitters used in an FDH 130 may accept a feeder cable having a number of fibers and may split incoming fibers into, for example, 216 to 432 individual distribution fibers that may be associated with a like number of end user locations.

The network 100 includes a plurality of breakout locations 125 at which branch cables (e.g., drop cables, stub cables, etc.) are separated out from main cables (e.g., distribution cables). Breakout locations can also be referred to as tap locations or branch locations and branch cables can also be referred to as breakout cables. Branch cables can manually be separated out from a main cable in the field using field splices. As an alternative to manual splicing in the field, pre-terminated cable systems have been developed. Pre-terminated cable systems include factory integrated breakout locations manufactured at predetermined positions along the length of a main cable (e.g., see U.S. Pat. Nos. 4,961,623; 5,125,060; and 5,210,812). Whether manual field splicing or pre-terminated cable systems are used, cutting the entire distribution cable 220 at each breakout location 125 is undesirable. Preferably only the subsets of the total number of fibers are spliced at each breakout location. Optical fiber accessing tools are used to selectively remove protective and insulating layers around the optical fibers to create a fiber access window in an optical fiber cable.

Optical fiber access tools of either the radial slitting or shaver types are typically used to cut a fiber access window in an optical fiber cable. Radial slitters typically include a radially mounted cutting blade for slitting a buffer tube along its length while shaver type tools typically include a cutting blade configured to remove a section of the buffer tube. Exemplary fiber access tools are disclosed in U.S. Pat. No. 4,972,581 to McCollum et al.; U.S. Pat. No. 5,140,751 to Faust; U.S. Pat. No. 5,577,150 to Holder et al.; U.S. Pat. No. 6,023,844 to Hinson, II et al.; U.S. Pat. No. 5,050,302 to Mills; U.S. Pat. No. 4,947,549 to Genovese et al.; U.S. Pat. No. 5,443,536 to Kiritsy et al.; U.S. Pat. No. 5,822,863 to Ott; U.S. Pat. No. 6,581,291 to Tarpill et al.; and U.S. Pat. No. 5,093,992 to Temple, Jr. et al. The tools and methods for accessing optical fibers can be improved. Known fiber access tools are typically difficult to manipulate, especially when the optical fibers to be accessed are tightly wound. In addition, conventional tools tend to bind or chatter, damaging or breaking the buffer tube and the optical fibers contained therein.

The present invention addresses the need in the art for an improved access tool and method for access to a limited number of fibers within an optical fiber cable without causing damage to optical fibers within optical fiber cables.

SUMMARY

The tool and method of the present invention enable an operator to easily and efficiently access optical fibers within an optical fiber cable. According to the invention an improved fiber access tool is provided that secures a buffer tube and provides a blade guide to facilitate the cutting of a fiber access window into a buffer tube. An advantage of the invention is that the tool engages the buffer tube to be cut without substantially displacing the buffer tube from its natural position within the distribution cable. The invention also provides a novel method of creating a fiber access window in a buffer tube. Other advantages will become apparent to those skilled in the art from the following detailed description read in conjunction with the appended claims and drawings attached hereto.

DETAILED DESCRIPTION

It is to be understood that both the foregoing general description and the following detailed description are exemplary and explanatory only and are not restrictive of the broad inventive concepts upon which the embodiments disclosed herein are based.

Figure 1:
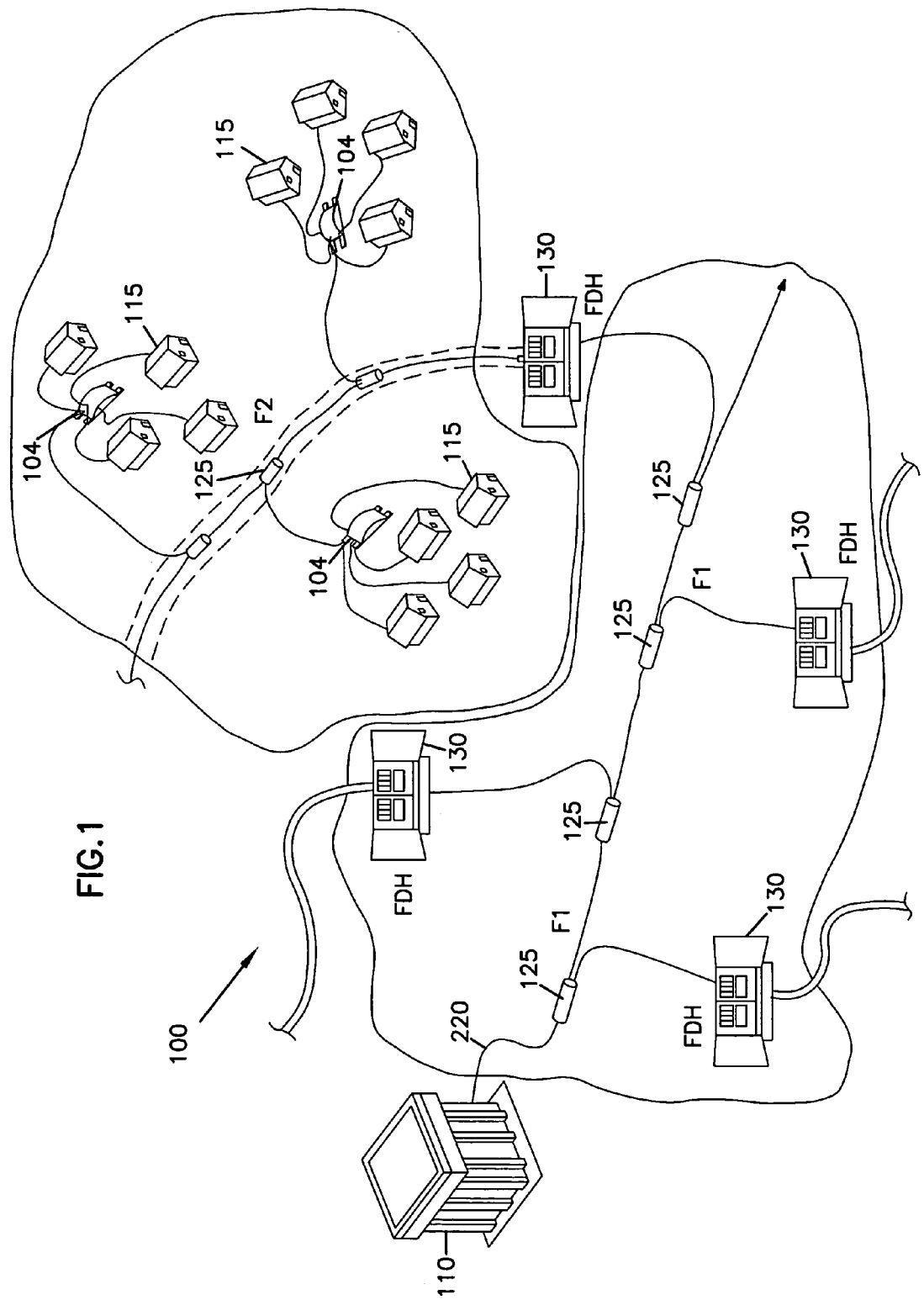
FIG. 1 shows a prior art passive fiber optic network.
Figure 2:
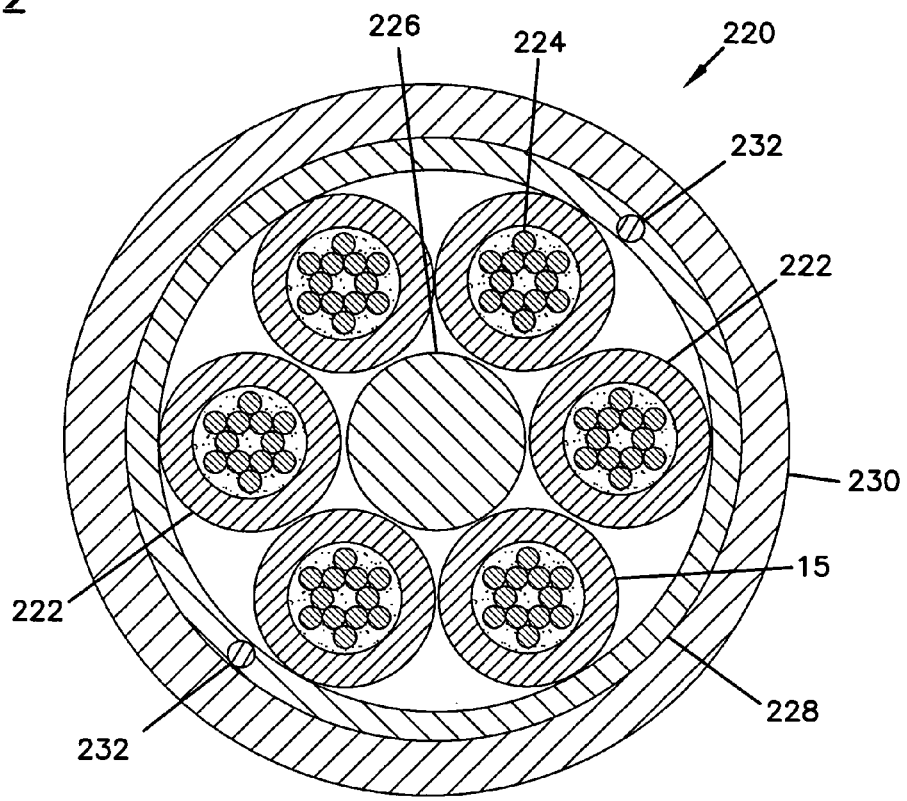
FIG. 2 is a cross-sectional view of a distribution cable.

Referring to FIG. 2, a typical optical fiber distribution cable 220 includes several buffer tubes 222 twisted in a helix configuration around a central elongate strength or support member 226, and the resultant structure is surrounded by an outer strength member 228 (e.g., a layer of Kevlar) and a protective jacket 230. The interior of the buffer tubes 222 is usually filled with a gel which surrounds the individual optical fibers, thereby providing lubrication, water resistance, and a light barrier between optical fibers for preventing interference between the fibers. The distribution cable 220 includes six separate buffer tubes 222 each containing twelve fibers 224. Ripcords 232 are provided for facilitating tearing away portions of the jacket 230 to access the buffer tubes 222 within the jacket 230. It should be appreciated that FIG. 2 depicts but one type of distribution cable; distribution cables can include any number of alternative internal configurations and any number of optical fibers therein.

Figure 3:
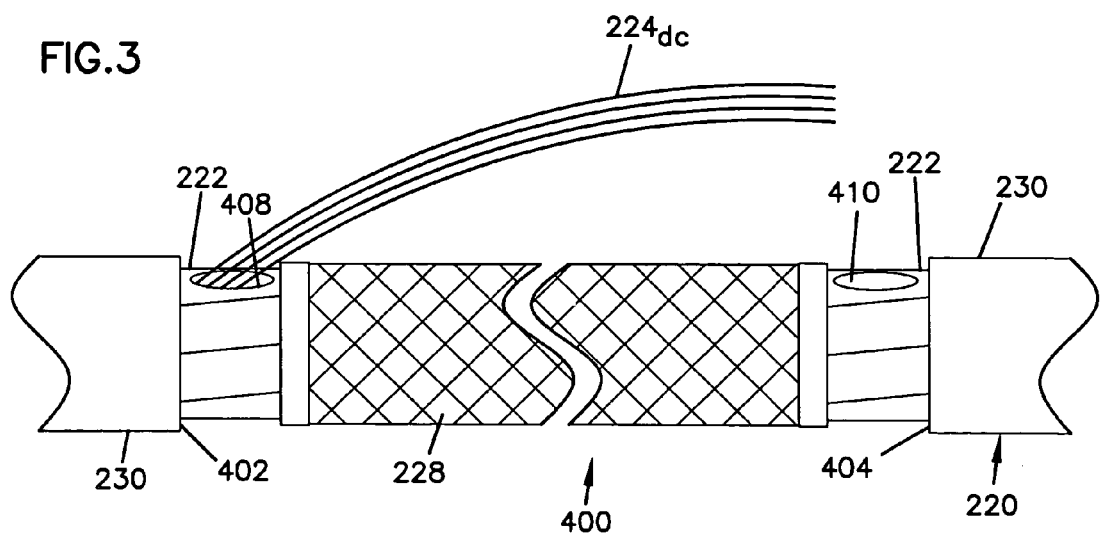
FIG. 3 shows an example of an initial preparation of the distribution cable at a breakout location of FIG. 1.

Referring to FIG. 3, an exemplary breakout location 125 on the distribution cable 220 is shown. A portion of the outer jacket 230 is first stripped away to provide a stripped region 400 having an upstream end 402 and a downstream end 404. Portions of the outer strength members 228 can then be removed adjacent the upstream and downstream ends 402, 404 so that the buffer tubes 222 are exposed. One of the buffer tubes 222 is then selected and a first window 408 is cut into the buffer tube adjacent the upstream end 402 of the stripped region 400, and a second window 410 is cut into the buffer tube 222 adjacent the downstream end 404 of the stripped region 400. The fiber access tool and method of the present invention can be used to cut the windows 408 and 410 in the buffer tube 222. The fibers $224_{dc}$ desired to be broken out are then accessed and severed at the second window 410. After the fibers $224_{dc}$ have been severed, the fibers $224_{dc}$ are pulled from the buffer tube 222 through the first window 408 and are ready to be terminated.

Figure 4:
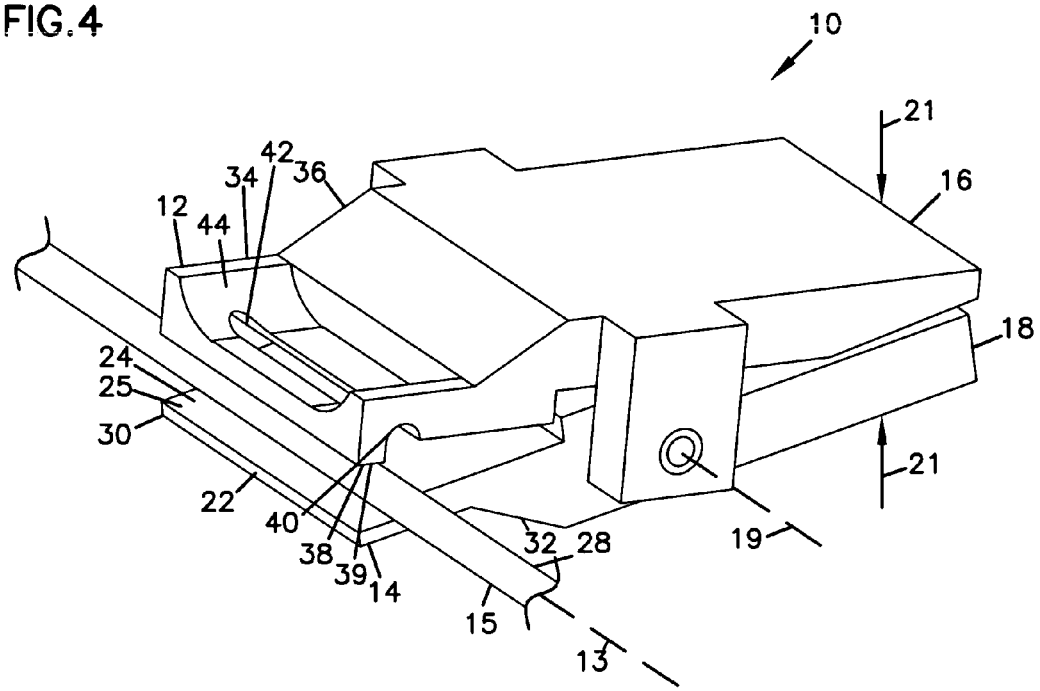
FIG. 4 is a perspective view of the fiber access tool according to a first embodiment of the invention in a disengaged position.
Figure 5:
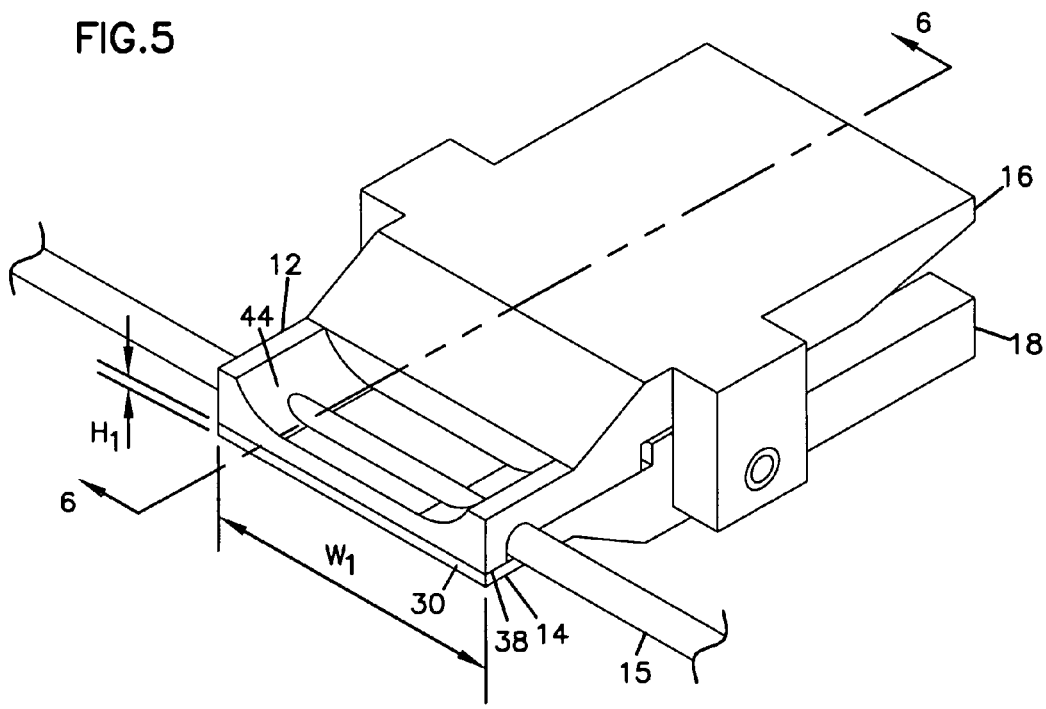
FIG. 5 is a perspective view of the fiber access tool of FIG. 4 in an engaged position.
Figure 6:
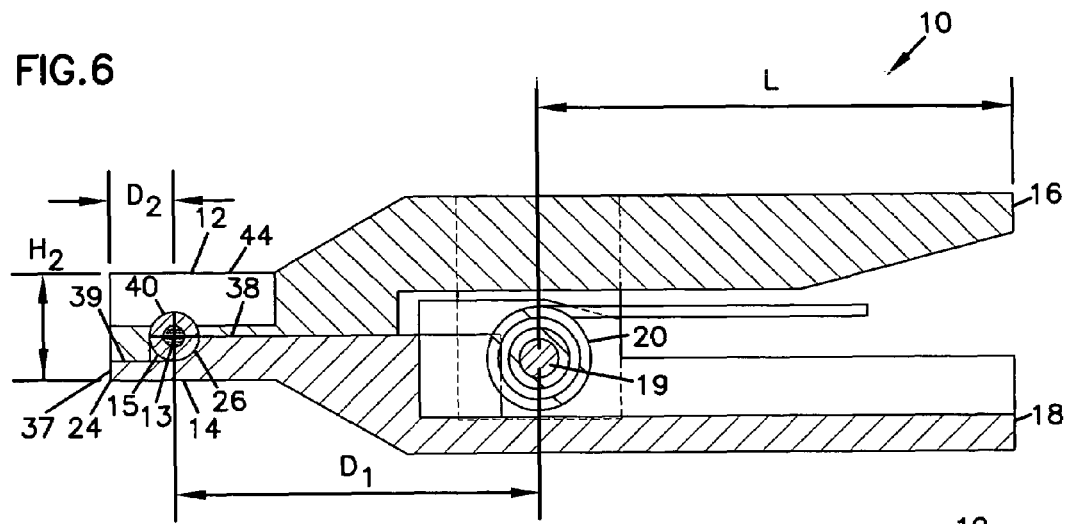
FIG. 6 is a cross-sectional view of the fiber access tool along line 6-6 of FIG. 5.

Referring primarily to FIGS. 4-6, an embodiment of the fiber access tool according to principles of the invention is shown. The fiber access tool 10 includes an upper jaw 12 and a lower jaw 14 which are configured to engage a buffer tube 15. The fiber access tool 10 also includes a first handle member 16 and a second handle member 18 that are connected to the upper and lower jaws 12 and 14. In the depicted embodiment the handle members 16 and 18 pivot about a pivot axis 19 and are normally biased apart by a spring 20 (see FIG. 6). Normally, the jaws 12 and 14 are closed, but when the handle members are squeezed in together in the direction illustrated by arrows 21 the jaws 12 and 14 open to receive or release the buffer tube 15. In some embodiments the distance D1 between the pivot axis 19 and the center axis 13 of the buffer tube 15 is sufficiently large to enable a person to grip a portion of the fiber access tool 10 in front of the pivot axis 19 while cutting into the buffer tube 15 or manipulating the optical fibers within the tube 15. Gripping the tool in front of the pivot axis can provide auxiliary pressure on the buffer tube 15 via the jaws 12 and 14. In the depicted embodiment the distance D1 is between ½ to 3 inches, and more preferably between 1.5 inches.

Referring primarily to FIGS. 4-8, the jaws 12 and 14 are illustrated and described herein in greater detail. The lower jaw 14 includes a low profile front engagement portion 22 and a rear portion 32. The rear portion 32 connects the front engagement portion 22 with the second handle member 18. The front engagement portion 22 in the depicted embodiment includes a top surface 24, which includes a flat portion 25 and a curved portion 26 (see FIG. 6). The curved portion 26 of the top surface 24 is shaped to contact the outer surface 28 of the buffer tube 15. The front engagement portion 22 also includes a narrow front surface 30 having a width W1 and a height H1. In some embodiments the height H1 is about 1/16-¼ inch and the width W1 is about ½-2 inches. The height H1 of the front surface 30 is relatively small to enable the tool 10 to engage the buffer tube 15 without pulling the buffer tube 15 away from its original location within the distribution cable.

Figure 9:
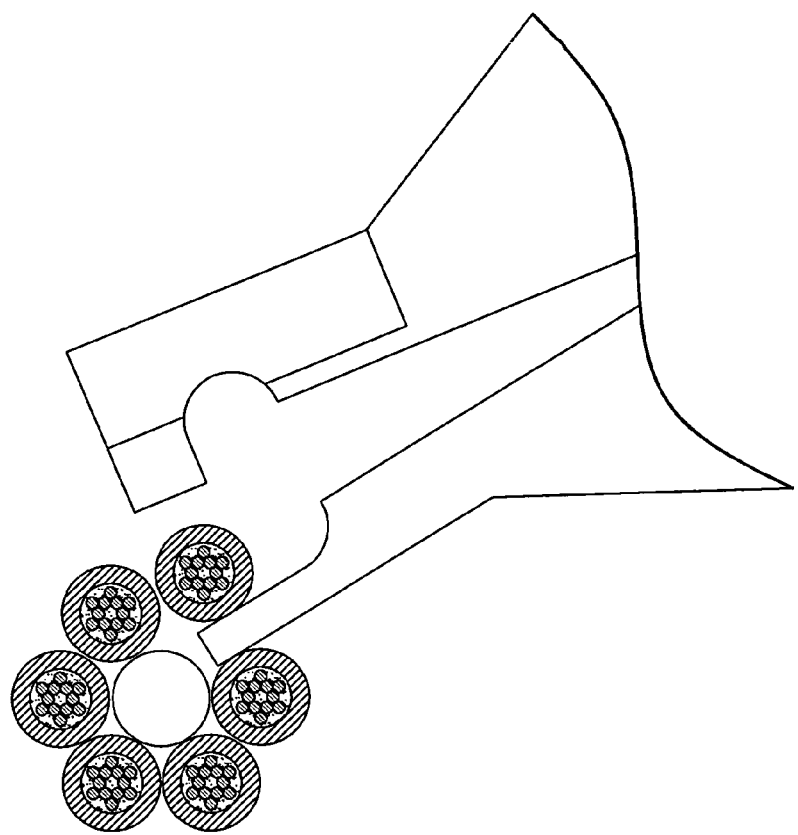
FIG. 9 is a cross-sectional view of the tool positioned between buffer tubes in a distribution cable.
Figure 10:
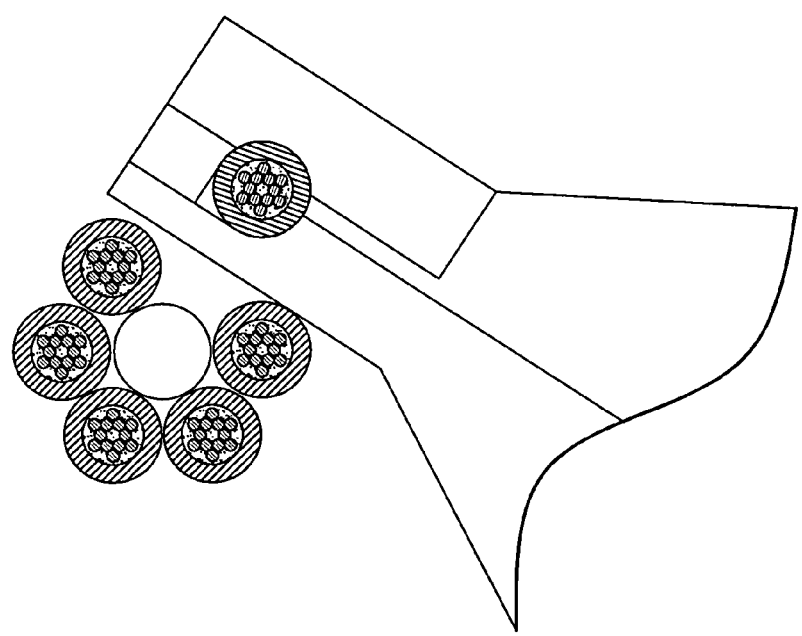
FIG. 10 is a cross-sectional view of the tool engaging and securing a section of the buffer tube in the distribution cable.

Referring to FIGS. 9 and 10, the low profile front engagement portion 22 of the lower jaw 14 can also be referred to as a buffer tube separator, as in the depicted embodiments the low profile front engagement portion 22 is slid between the buffer tube 15 to be accessed and the other buffer tubes 222 in the distribution cable 220. By rotating the fiber access tool 10, the selected buffer tube 15 can be pried away from the non-selected buffer tubes 222 so that the upper jaw 12 can conveniently engage the selected buffer tube 15.

Referring back to FIGS. 4-8, the upper jaw 12 includes a front engagement portion 34 and a rear portion 36. The rear portion 36 connects the front engagement portion 34 with the first handle member 16. The engagement portion 34 includes a top surface 44 and a bottom surface 38. The bottom surface 38 of the front engagement portion 34 is configured to engage the outer surface 28 of a buffer tube 15. The bottom surface 38 includes a flat portion 39 and a curved portion 40. The curved portion 40 of the bottom surface 38 secures the buffer tube 15 against the curved portion 26 of the top surface 24 of the engagement portion 22. In the depicted embodiment the curved portion 26 defines a groove recess in the bottom surface. It should be appreciated that many other surface profiles are possible. For example, in an alternative embodiment the bottom surface could include one or more teeth-like structures similar to those commonly found on pliers.

In the depicted embodiment the combined height of the jaws 12 and 14 is relatively small to enable the fiber access tool 10 to be manipulated in tight spaces. In the depicted embodiment the combined height H2 of the jaws 12 and 14 in the engaged position is generally between ⅛ to ½ inch. In addition, the distance D2 (shown in FIG. 6) between the front of the tool 37 and the center axis 13 of the buffer tube 15 is also 1/16 to ½ inch.

Figure 7:
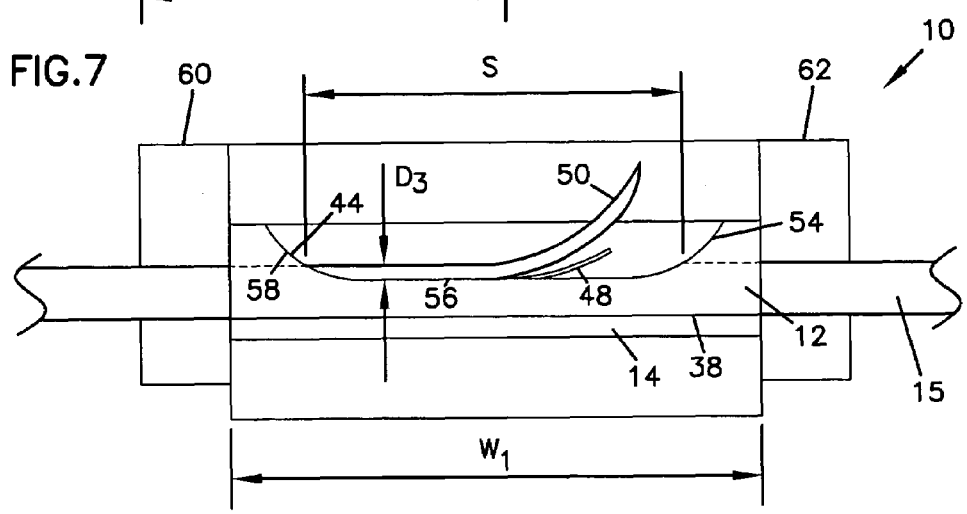
FIG. 7 is a front view of the fiber access tool of FIG. 5 while the fiber access window is being cut.

The engagement portion 34 includes a slot 42 that extends between the top and bottom surfaces 44 and 38 of the engagement portion 34. The slot 42 is configured to expose a portion of the outer surface 28 of the buffer tube 15 to be cut away to create a fiber access window 46 (see FIG. 8). The slot has a length S that is less than the width W1 of the front engagement portion 22. The top surface 44 of the engagement portion 34 is configured to serve as a blade guide to facilitate the blade 48 cutting a cord 50 from the buffer tube 15 without cutting into the optical fibers 52 housed within the buffer tube 15. In the depicted embodiment the top surface 44 includes a generally U-shaped profile, which controls the path and depth of the cut. More particularly, the top surface 44 includes a first curved transition section 54, a flat bottom section 56, and a second curved transition 58. The transition surfaces 54, 58 guide the blade 48 into and out of the buffer tube 15 and the bottom surface 56 guides the blade along the buffer tube 15. In the depicted embodiment the part of the buffer tube 15 to be cut away protrudes from the slot 42. The configuration of the slot can be set based upon the thickness and diameter of the buffer tube 15 sheath. The configuration of the slot 42 relative to the transition sections 54 and bottom section 56 can be used to control the depth of the cut D3 into the buffer tube 15. Typically the depth D3 is slightly larger than the thickness of the buffer tube 15. Referring to FIG. 7, the first transition section 54 guides the blade 48 as it breaches buffer tube 15, cutting a first end of the fiber access window 46. The bottom section 56 guides the blade 48 as it cuts the body portion of the fiber access window 46. The second transition section 58 guides the blade 48 as it exits the buffer tube 15 and cuts the second end of the fiber access window 46. In the depicted embodiment, upper and lower jaws 12 and 14 clamp onto the buffer tube 15 during the cutting step described above. The jaws 12 and 14 prevent the buffer tube 15 from sliding axially away from the blade 48 during the cutting step. The jaws 12 and 14 also prevent the buffer tube from buckling or bulging towards the blade 48 or away from the blade 48 during the cutting step. In other words, the jaws 12 and 14 work in concert with the transition sections 54 and 58 and the bottom section 56 of the tool to help the operator cut a fiber access window 46 in the buffer tube 15. It should be appreciated that although the fiber access window 46 is shown cut from the right to the left, many other directions are possible.

Figure 8:
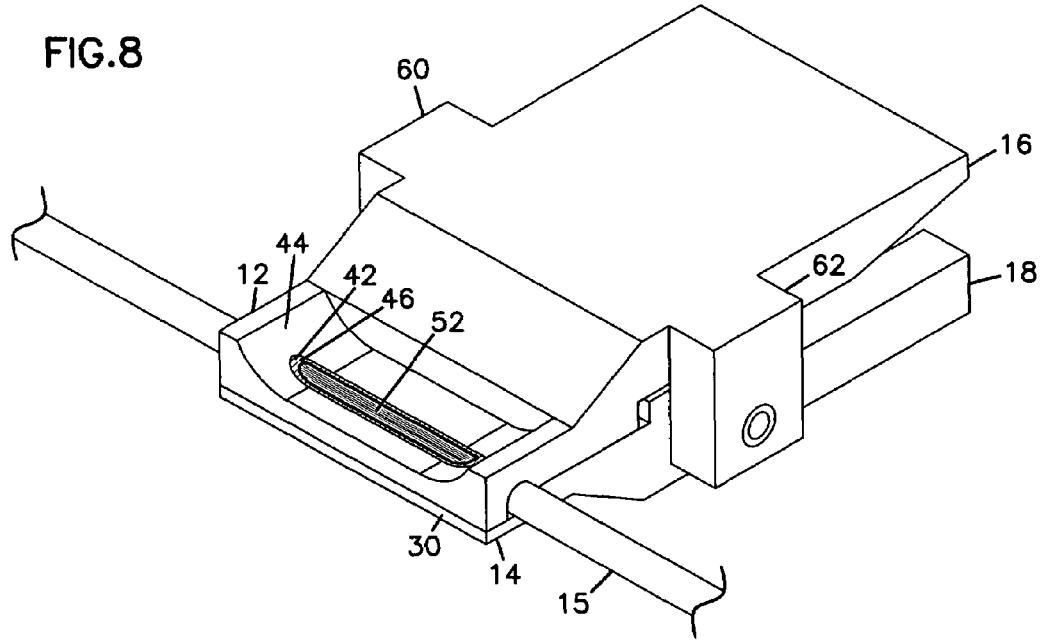
FIG. 8 is a perspective view of the fiber access tool of FIG. 4 in an engaged position after the fiber access window has been cut.

Referring to FIG. 8, once the cord 50 of the buffer tube 15 is removed, the optical fibers 52 are exposed and can be accessed. The tool 10 can be used to support the buffer tube 15 while the operator manipulates the optical fibers 52 therein.

The first handle portion 16 includes a pair of arms 60 and 62 that extend over and are pivotally connected to the sides of the second handle portion 18. The handles have a length L measured from the pivot axis 19. Preferably, the length L is between 1 to 5 inches. In the depicted embodiment the tool is biased closed by the spring 20, which enables the operator to use both hands to manipulate the fibers or perform the cut as the tool 10. The spring 20 is shown as a torsion spring positioned near the pivot 19. It should be appreciated that many other spring arrangements are possible including, for example, a coil compression spring could be used (not shown but well known in the art).

From the foregoing detailed description, it will be evident that modifications and variations can be made in the devices of the disclosure without departing from the spirit or scope of the invention. For example, it should be appreciated that the optical fiber access tool according to the invention can be used to cut windows in more than just buffer tubes or optical fiber cables. It can be adapted to cut windows into cylindrical-shaped tubes where it is important to control the depth of the cut.

What is claimed is:

1. An optical fiber access tool comprising:
   an upper member including an engagement portion and a handle portion;
   a lower member including an engagement portion and a handle portion, the upper and lower members being pivotally connected to each other between their engagement portions and their handle portions; and
   a blade guide disposed on the engagement portions of at least one of the upper and lower members, the blade guide configured to facilitate guiding a blade over a through slot disposed on the engagement portions of at least one of the upper and lower members, the through slot being configured to expose a portion of buffer tube held between the engagement portions;
   wherein the blade guide is configured to control the depth that the blade cuts into the buffer tube; and
   wherein the blade guide includes a U-shaped profile including a first side wall configured to guide a blade into the buffer tube, a bottom wall configured to guide a blade across a portion of the buffer tube, and a second side wall configured to guide a blade out of the buffer tube.

2. An optical fiber access tool comprising:
   an upper member including an engagement portion and a handle portion;
   a lower member including an engagement portion and a handle portion, the upper and lower members being pivotally connected to each other between their engagement portions and their handle portions; and
   a blade guide disposed on the engagement portions of at least one of the upper and lower members, the blade guide configured to facilitate guiding a blade over a through slot disposed on the engagement portions of at least one of the upper and lower members, the through slot being configured to expose a portion of buffer tube held between the engagement portions, wherein the blade guide includes a U-shaped profile including a first side wall configured to guide a blade into the buffer tube, a bottom wall configured to guide a blade across a portion of the buffer tube, and a second side wall configured to guide a blade out of the buffer tube.

3. The optical fiber access tool according to claim 2, further comprising a spring extending between the upper and lower members biasing the handle portions away from each other and the engagement portions toward each other.

4. The optical fiber access tool according to claim 2, further comprising a groove disposed across the engagement portions of at least one of the upper and lower members, the groove configured to engage an outside surface of a buffer tube.

5. The optical fiber access tool according to claim 4, wherein the groove includes a curved surface configured to engage the outside surfaces of a buffer tube.

6. The optical fiber access tool according to claim 5, wherein engagement portions of the upper and lower members both include curved surfaces configured to engage the outside surface of a buffer tube.

7. The optical fiber access tool according to claim 2, wherein engagement portions are constructed to engage a top and a bottom surface of a buffer tube and wherein the combined height of the engagement portion is between about $\frac{1}{8}$ inch to $\frac{1}{2}$ inch.

8. The optical fiber access tool according to claim 2, wherein the engagement portion includes a front end, wherein the distance between the front end and the center axis of a buffer tube held between the engagement portions is between about $\frac{1}{16}$ inch to $\frac{1}{2}$ inch.

9. The optical fiber access tool according to claim 2, wherein the pivot between the upper and lower members is configured to be at least about 3 to 5 inches from the center axis of a buffer tube held between the engagement portions.

* * * * *